United States Patent [19]

Gagnon

[11] Patent Number: 4,541,155

[45] Date of Patent: Sep. 17, 1985

[54] PORTABLE BEAM CLAMP

[76] Inventor: Paul L. Gagnon, 3714 Via Pacifica Walk, Oxnard, Calif. 93030

[21] Appl. No.: 604,324

[22] Filed: Apr. 26, 1984

Related U.S. Application Data

[63] Continuation-in-part of Ser. No. 482,925, Apr. 7, 1983.

[51] Int. Cl.[4] ............................................. A44B 21/00
[52] U.S. Cl. ........................................ 24/486; 24/490; 24/514; 24/569; 248/72; 248/228; 403/118
[58] Field of Search ................ 24/486, 460, 268, 490, 24/491, 492, 499, 514, 569, 328; 248/72, 228; 269/240, 246; 403/118

[56] References Cited

U.S. PATENT DOCUMENTS

| | | | |
|---|---|---|---|
| 471,909 | 3/1892 | Still | 269/246 |
| 524,330 | 8/1894 | Lane | 269/240 |
| 1,137,693 | 4/1915 | Baxter | 269/246 |
| 1,474,059 | 11/1923 | Voellmecke | 248/72 |
| 1,851,353 | 3/1932 | Dickman | 248/228 |
| 2,499,981 | 3/1950 | Strobel | 24/569 |
| 2,529,153 | 11/1950 | Hain | 248/228 |
| 2,529,686 | 11/1950 | Green | 24/569 |
| 2,675,201 | 4/1954 | Friel | 248/228 |
| 2,678,786 | 5/1954 | Kindorf | 248/72 |
| 2,868,485 | 1/1959 | Friel | 248/72 |
| 2,923,995 | 2/1960 | Homma | 24/569 |
| 3,039,161 | 6/1962 | Gagnon | 24/490 |
| 3,331,111 | 7/1967 | Carver | 24/514 |
| 3,350,755 | 11/1967 | Hanner | 24/460 |
| 3,687,499 | 8/1972 | Guilfoyle, Sr. | 403/118 |

FOREIGN PATENT DOCUMENTS

| | | | |
|---|---|---|---|
| 250142 | 5/1948 | Switzerland | 24/569 |
| 1397075 | 6/1975 | United Kingdom | 248/228 |

Primary Examiner—Victor N. Sakran
Attorney, Agent, or Firm—Kenneth J. Hovet; Kenneth J. Hovet

[57] ABSTRACT

A portable clamp/hanger device that provides a rigid connection that is releasable between a support beam and a hoist or other load-carrying means. The device includes a movable platform pivoted to a stationary U-shaped member with an opening therebetween. The flange of a support beam is located within the opening and the platform moves against the flange by tightening an underlying screw threaded through a hollow anchor shaft which is secured to the lower arm of the stationary member. A collar swivels universally about a portion of the anchor shaft and includes posts from which swings a hanger for attaching hooks, shackles, rope ties and the like. The platform is provided with an adjustable cleat for adapting to various sized beams. A locking mechanism is included to prevent loosening of the screw. Alternatively, auxiliary pressure can be applied to the movable jaw with a cam and ratchet mechanism or other force transfer device.

28 Claims, 17 Drawing Figures

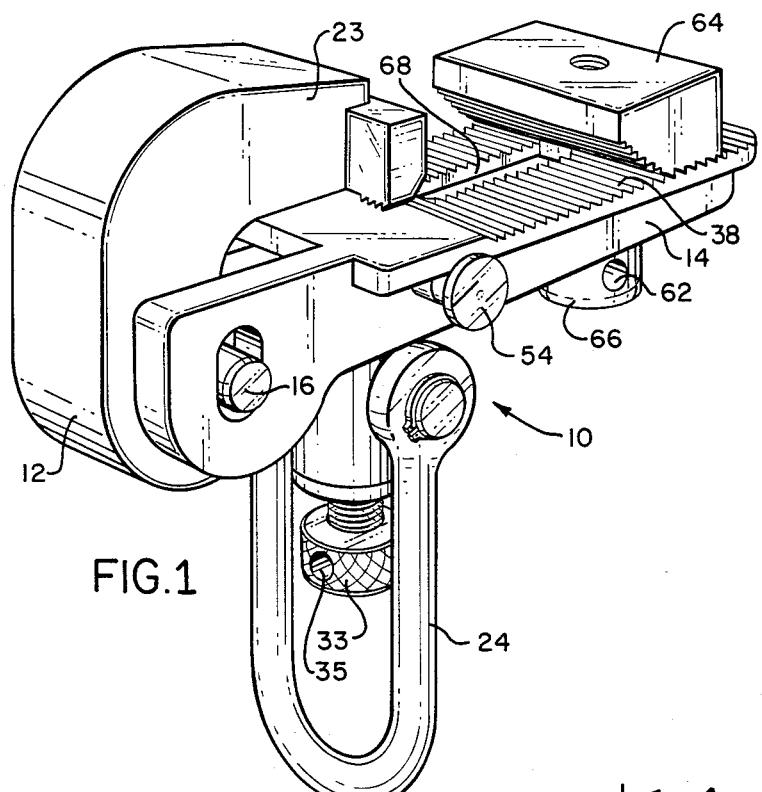
FIG.1
FIG.2
FIG.3
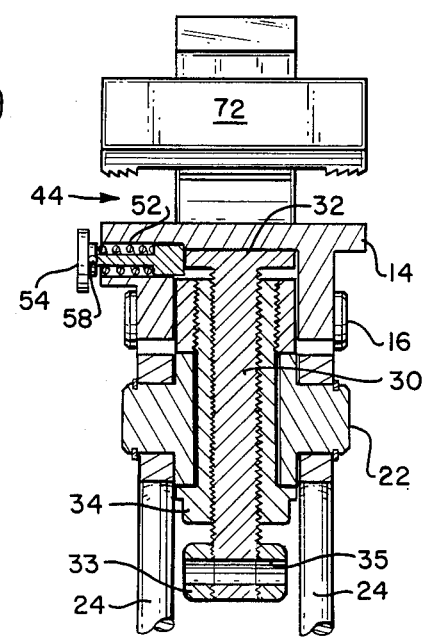
FIG.4

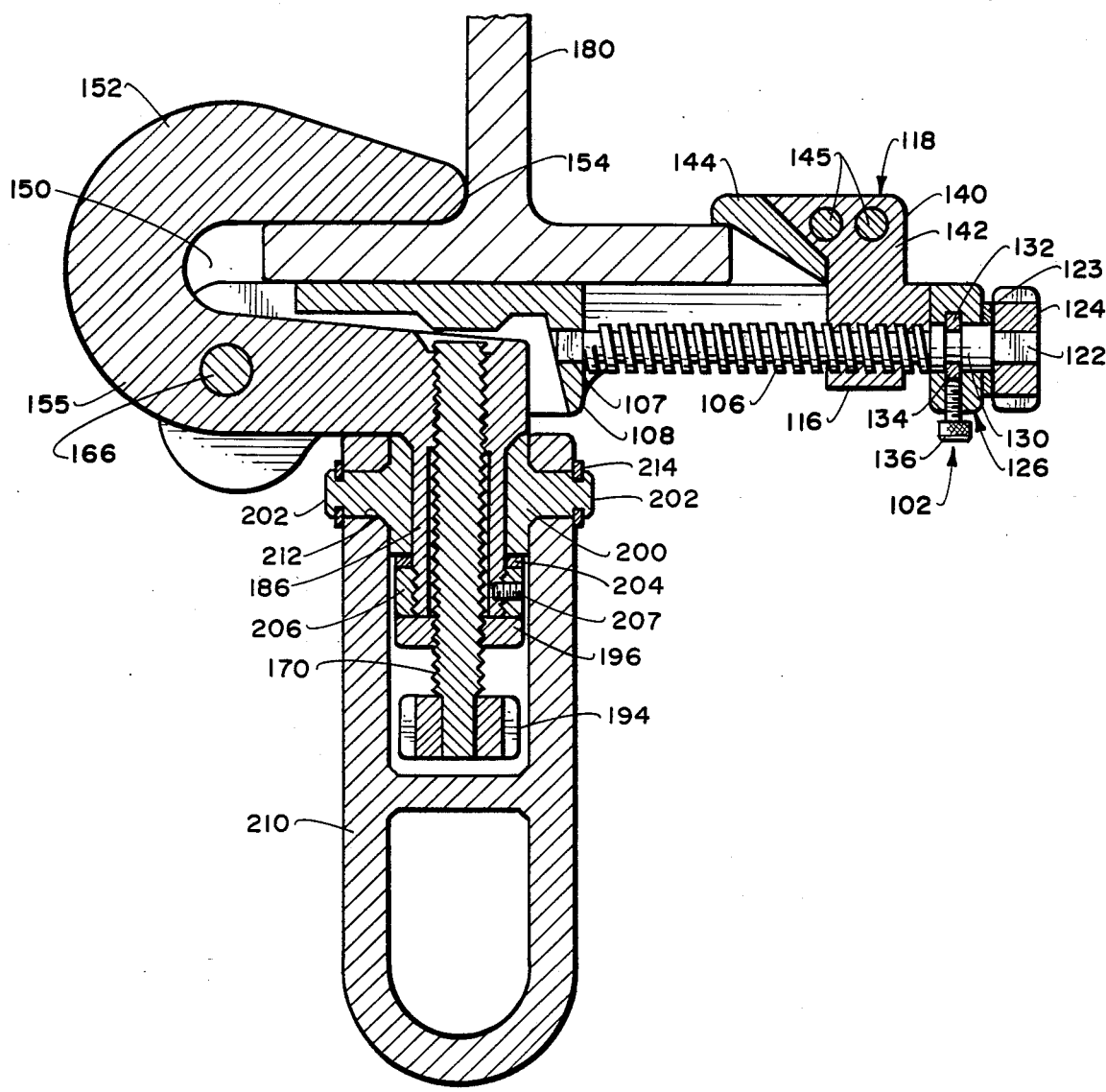
Fig. 13.
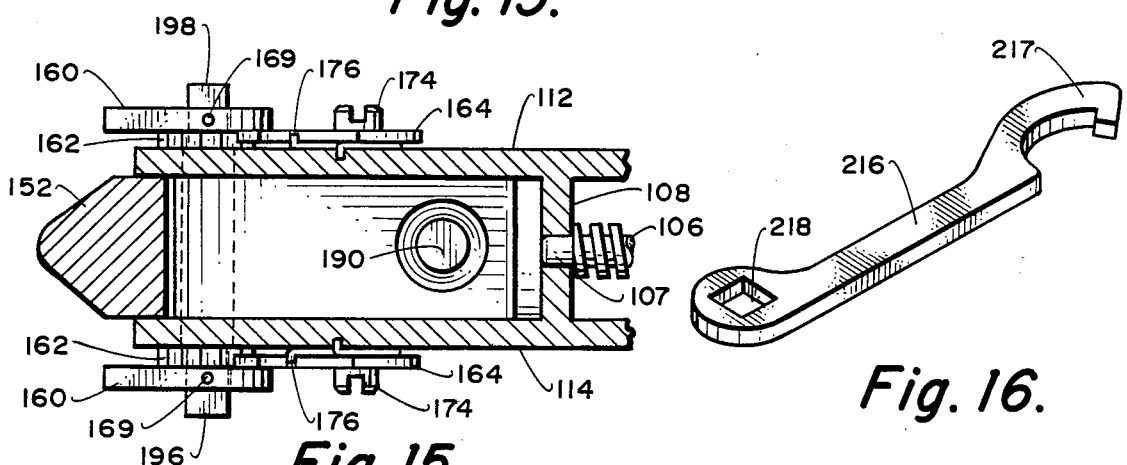
Fig. 15.
Fig. 16.

PORTABLE BEAM CLAMP

This is a continuation-in-part of application Ser. No. 482,925 filed Apr. 7, 1983 now abandoned.

BACKGROUND OF THE INVENTION

1. Field of the Invention

The invention relates to clamping assemblies and, more particularly, to devices that can be releasably secured to support structures and provide a connecton therefrom to load-carrying means.

2. Description of the Prior Art

Temporary hanger systems have been described in U.S. Pat. Nos. 3,039,161 and 3,350,755. The system shown in U.S. Pat. No. 3,350,755 utlizes a wedge to force interfitting fingers against the flanges of a beam. The wedge is equipped with an eyebolt for connection to various objects.

A problem with the finger-wedge system is that it can only be used with I beams. Its effectiveness is dependent, in part, on the straightness of the beam flange edges and whether such are parallel. Also, the system is subject to loosening upon vibration or flexure of the beam. Still further, it is very difficult to insure equal distribution of load to each finger—both from a design standpoint and a users standpoint.

The clamp/hanger system closest to the present device is that shown in the inventor's earlier U.S. Pat. No. 3,039,161. In that patent, a U-shaped bracket is shown as being pivoted to a stationary jaw. An eyebolt is threaded through the jaw and is rotated to exert force against the bracket which, in turn, holds a beam against the jaw.

A significant disadvantage of the above system is its lack of versatility. It cannot be used with large I beams or beams with long flanges because of the short predetermined clamp opening. Further, the clamp has a narrow jaw face and therefore lacks the ability to inhibit twist-off by transverse forces.

Still further, the clamp's load strength is limited by the eyebolt strength. In any position other than horizontal, shear forces on the eyebolt place a severe limitation on the amount of load the clamp can safely take. This disadvantage is especially significant in that quite often there are no horizontal beams available in the area where one may want to use the clamp.

SUMMARY OF THE INVENTION

The present invention provides an improved clamp that can be attached to all types of beams. Within prescribed design criteria, it can safely support heavy loads regardless of beam orientation and it resists twisting-off by transverse forces.

The clamp comprises a movable jaw pivoted to a stationary jaw forming an opening therebetween. An anchor shaft is secured to the stationary jaw and a clamping screw extends through the shaft. Rotation of the screw raises or lowers the movable jaw and opens or closes the clamp opening.

The anchor shaft is provided with a swivel collar from which extends a rotatable load connector means. This allows direct gravity loading while minimizing twisting from forces transverse of the clamp. Auxiliary pressure means may also be included to further enhance the effectiveness of the clamping force.

The movable jaw includes a longitudinally adjustable cleat having a wedge-shaped engagement surface. The cleat can operate in conjunctiion with an engagement member on the stationary jaw to securely grip the flange portion of a beam.

BRIEF DESCRIPTION OF THE DRAWINGS

FIG. 1 is an overall perspective view of the beam clamp of the present invention.

FIG. 2 is a top plan view of FIG. 1.

FIG. 3 is a cross-sectional view taken along lines 3—3 of FIG. 2 showing a beam portion in phantom clamped in place.

FIG. 4 is a cross-sectional view taken along lines 4—4 of FIG. 2.

FIG. 13 is a cross-sectional view taken along lines 13—13 of FIG. 12.

FIG. 15 is a fragmentary cross-sectional view taken along lines 15—15 of FIG. 11.

FIG. 16 is a perspective view of a wrench useful in operating the cam and ratchet mechanism of the invention.

DESCRIPTION OF THE PREFERRED EMBODIMENT

Figure 6:
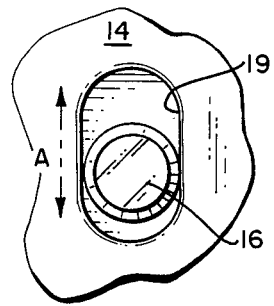
FIG. 6 is an enlarged fragmentary view taken along line 6 of FIG. 5.
Figure 7:
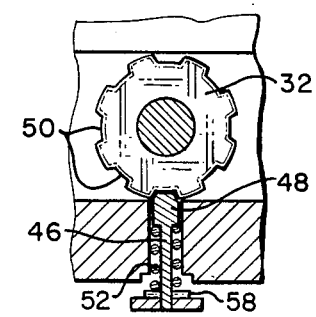
FIG. 7 is a fragmentary view taken along lines 7—7 of FIG. 5.

With reference now to the drawings, and more particularly to FIG. 1, the improved beam clamp of the present invention is shown generally by reference numeral 10. The clamp comprises an arched stationary jaw member (12) which includes an upper arm (23) and a lower arm (25). A pivot pin (16) is secured to the stationary jaw member proximate the lower arm region. Movable jaw member (14) is connected to the stationary jaw member with opposing ends of pin (16) extending through corresponding openings (19) of the movable jaw. The openings are slightly elongated to allow vertical movement of the movable jaw as best shown by arrow A in FIG. 6.

Figure 8:
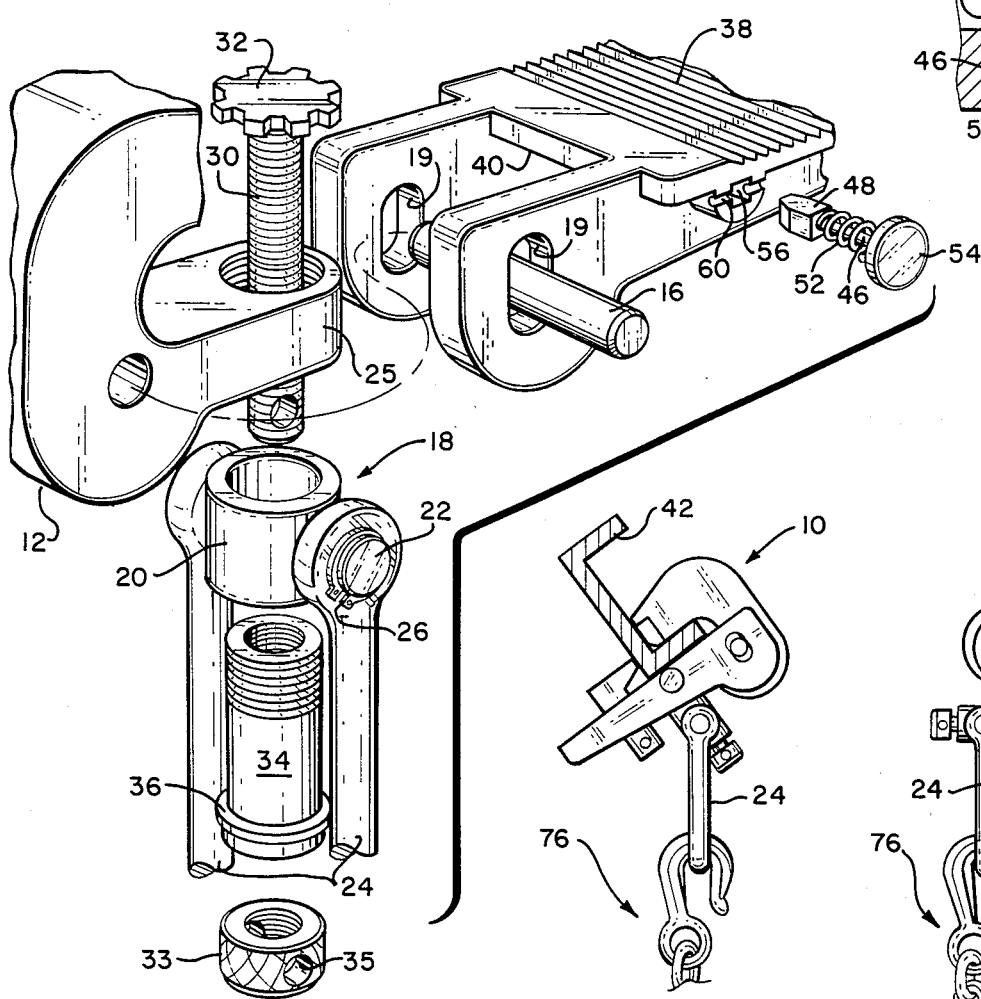
FIG. 8 is an exploded fragmentary perspective view of the clamp in FIG. 1.

Secured to lower arm (25) of the stationary jaw is an attachment assembly shown generally by reference numeral (18) in FIG. 8. The assembly includes a hollow anchor shaft (34) which is threadedly connected to the jaw lower arm. Set screw (37) secures the shaft and prevents its rotation.

A portion of the anchor shaft extends below the lower arm with the lowermost end having an abutment ring (36). The abutment ring supports collar (20) which swivels about the aforesaid lower portion of the anchor shaft (34). The collar is provided with load connector means which comprises two opposing mounting posts (22) extending outwardly therefrom.

A connector member is attached to the posts which, in the preferred embodiment, comprises U-shaped hanger (24). The ends of the hanger include openings for rotatable engagement with each post (22) and further includes respective retainer rings (26) to maintain the hanger against dislodgement from the posts. It will be appreciated that brackets, chain links and other types of connector members may be attached to the collar and serve in an equivalent manner to the above-described hanger.

The hollow interior of anchor shaft (34) is threaded and clamp screw (30) threadedly extends therethrough. The clamp screw includes a pressure pad (32) at its uppermost end and a manual engagement means at its lowermost end. As shown, such means comprises knurled cap (33) and aperture (35). The purpose of the manual engagement means is to enable a user of the clamp to rotate the clamp screw either manually, by grasping the knob, or with a leverage tool, such as a rod which may be inserted into or through the aperture (35). In this way, greater force may be exerted to tighten and loosen the clamp screw. Other manual engagement means which may be utilized in place of the aforementioned may simply be a slot or notch or tab, any one of which may be operated by a tool. Other means such as a key or handle may be utilized in ways that would be obvious to one skilled in the art.

The pressure pad (32) is adapted to engage a corresponding surface on the underside (40) of the movable jaw (14). It is expected that corresponding threads of the clamp screw and anchor shaft interior will cause vertical movement of the screw upon the rotation thereof. Typically clockwise rotation will result in upward movement of the pressure pad against the movable jaw underside and force the jaw to rise into engagement with a portion of beam (42) positioned within the clamp opening (44).

The clamp screw is provided with a locking mechanism to prevent undesired rotation which may result in the possibility of the clamp becoming loosened from its location on a beam. To this end, pressure pad (32) is provided with notches (50) about its peripheral edge. A plunger is mounted adjacent to and transversely of the pressure pad through an opening (56) of the movable jaw. Head (48) of the plunger is sized to engage the notches and prevent the pressure pad from rotating. Compression spring (52) biases the plunger in place within the desired notch. Disengagement of the plunger occurs by grasping cap (54) and withdrawing the plunger and rotating it whereby key (58) will be out of alignment with corresponding groove (60). Release of the cap will allow the key to rest against the side of the jaw rather than within the groove thereby keeping head (48) out of notches (50).

Other locking means could be used in place of the above-described mechanism. For example, a removable pin could be inserted into the screw or a set screw could be used or cap (33) could operate as a locking nut.

Upperface (38) of the movable jaw member (14) is provided with a movable cleat (64). The cleat operates to engage a portion of a beam flange and assist in securing it within the clamp opening (44). The cleat is provided with securement means shown as cap screw (66) which includes a threaded portion (67). This portion extends from beneath the movable jaw through slot opening (68), which extends along the longitudinal axis of said jaw, into a corresponding threaded opening in the bottom of the cleat. Rotation of the cap screw in the same manner with the above-described manual engagement means, e.g., by hand or by tool in aperture (62), will result in vertical movement, shown by arrow B in FIG. 5, and the corresponding tightening and loosening of the cleat to the upperface (38). Of course, loosening allows one to provide an enlarged opening (44) for engagement of the clamp to a beam and allows for the longitudinal adjustment of the cleat along the aforesaid longitudinal axis of the movable jaw.

The cleat is provided with a wedge-shaped beam engagement surface (70). With such a wedge-shaped inclined surface, a portion thereof will overlap a portion of the beam flange and thereby inhibit its upward movement when the cleat is securely adjusted thereagainst.

To help ensure alignment of the cleat so that the engagement surface will be perpendicular to the longitudinal axis of the jaw, the underside of the cleat is provided with an extension comprising guide member (69). The guide member is sized to fit snugly within the slot opening (68) and thereby inhibit undesired rotation and misalignment of the cleat, particularly during the tightening and loosening thereof by rotation of cap screw (66).

To further inhibit misalignment of the cleat, upperface (38) is grooved transversely of the longitudinal axis thereof. The bottom of the cleat is likewise grooved parallel to surface (70) whereby upon tightening of the cleat, corresponding grooves will become engaged. This also helps to strengthen the cleat's position on face (38).

Free end (28) of upper arm (23) is provided with beam engagement member (72). The inwardly directed face of the member is preferrably parallel to and about coextensive with the cleat beam engagement surface (70) so that a beam (42) located therebetween will be firmly grasped and held in a secure manner. Because the aforementioned beam engagement surfaces are coextensive and preferrably at least about equal to the width of the upperface (38), a strong leverage results. This greatly inhibits unwanted twisting of the clamp during use.

Figures 9, 10:
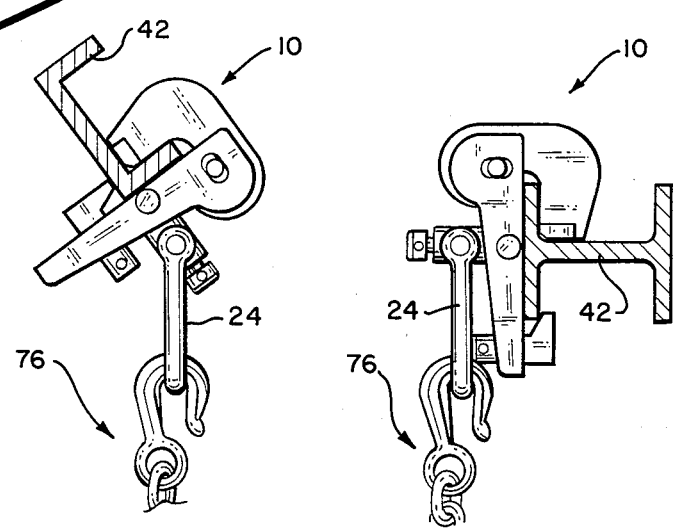
FIG. 9 is a side elevation view of the clamp of FIG. 1 secured to an inclined channel beam with a hook and chain connected to the hanger.
FIG. 10 is a side elevation view of the clamp of FIG. 1 shown in a horizontal alignment attached to an H-beam with a hook and chain connected to the hanger.

The advantage and purposes of the above-described structural features of the present invention will become readily apparent with reference to FIGS. 9 and 10. As seen therein, the clamp can operate effectively in a vertical disposition, as shown in FIG. 10, and at an incline, as shown in FIG. 9. In all cases, the rotatable hanger will allow load forces to be directed upon the intended collar anchor shaft and clamp screw without unwanted transverse forces or unduly leveraged downward forces.

The adjustable cleat (64) allows attachment to all types of beams such as the channel beam of FIG. 9 and the H-beam of FIG. 10. As shown in both figures, a hook and chain assembly (76) is shown engaged to hanger (24). A wide variety of other means can be used for connecting a load to the hanger.

Figure 5:
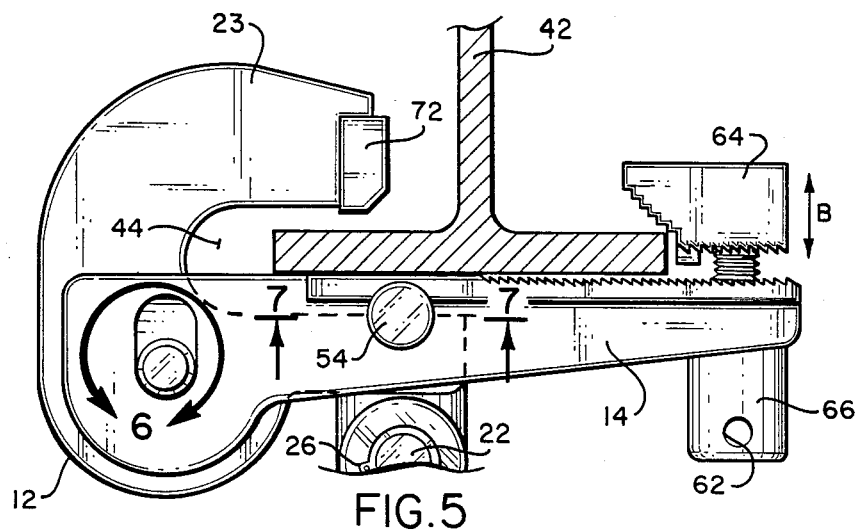
FIG. 5 is a fragmentary side elevation view of the clamp of FIG. 1 illustrating its operation in securing a beam shown in fragmentary cross-section.

In operation, it is expected that the locking mechanism will be disengaged by having the plunger retracted from notches (50) with key (58) rotated out of groove (60). The clamp screw will be rotated so that the pressure pad is about adjacent the upper surface of lower arm (25) and the movable jaw will be in its lowermost position. Similarly, cleat (64) will be loosened, as shown in FIG. 5, to its position farthest away from beam engagement member (72).

As disposed above, the clamp may be slid manually upon the flanges of a beam (42). The clamp will be inserted upon the flange until engagement member (72) abuts against the flange web and/or other surface of the beam. Thereafter, cleat (64) will be moved inwardly until it engages an opposing surface of the beam. At this point, cap screw (66) may be rotated either by hand or by inserting a tool into orifice (62) in the same manner as previously described with reference to knob (33) and aperture (35).

Upon snugging the cleat against the beam flange, the clamp screw (30) may then be rotated to elevate the pressure pad and force the movable jaw against the corresponding surface of the beam. This will result in the beam being lifted against the upper arm (23) of the stationary jaw and/or the bottom portion of beam engagement member (72).

Similarly, the upper surface of the opposing beam flange will be forced against the inclined beam engagement surface (70) of the cleat. Further tightening of the cap screw (66) may occur to ensure the cleat is firmly drawn against the upperface (38) and corresponding grooves while simultaneously firmly being drawn down against and overlapping the upper edge of the aforementioned beam flange. (In the case of an angle beam, the cleat will abut against the web of the beam—note FIG. 9.) Finally, the knob (33) may be given a final tightening by insertion of a leverage tool or the like into aperture (35).

Upon final tightening of the clamp screw, cap (54) of the locking mechanism may be rotated until key (58) is aligned with groove (60) allowing the plunger to engage a notch or project against the edges of the pressure pad (32). If necessary, slight rotation may be required to ensure insertion of plunger head (48) into one of the peripheral notches.

As described above, the beam clamp is now ready for connection via a connecting assembly, such as hook and chain (76), to a load not to exceed the rated capacity of the overall clamp. The wide beam flange engagement surfaces inhibit twist-off. They also reduce the likelihood of bending the beam flange. The swivel collar and rotatable hanger serve to directly align load forces to the anchor shaft and screw at any disposition of the clamp. Overall, a more secure and stable beam attachment occurs than that provided by the prior art.

The advantages and objectives of the invention is further enhanced with the clamp construction shown in FIGS. 11-17. In this embodiment, an affirmative positioning means (102) is used to more conveniently locate the cleat where desired and, an auxiliary pressure means (104) is used to strengthen and balance the grip of the clamp to a beam. Either one or both of the above means can be used with the clamp shown in FIGS. 1-10 since the basic overall construction is similar.

With particular reference now to FIGS. 13 and 15, the positioning means comprises positioning screw (106) journalled at its first end (107) to a cross wall portion (108) of movable jaw (110). The cross wall extends between opposing sidewalls (112), (114) of the movable jaw.

The positioning screw is threaded through the lower portion (116) of cleat (118). The cleat is movable by rotation of the screw along the longitudinal axis of the movable jaw within slot opening (120) in the directions of Arrow C.

The opposing end (122) of screw (106) extends beyond the end of the movable jaw and is provided with washer (123) and grasping means shown as knob (124) for rotating the screw. Of course, tools or leverage means known in the art other than knob (124) may be used to impart a rotational motion to the screw.

Proximate end (122) is bracket (126). The bracket is secured to the movable jaw and the opposing end of the screw is journalled thereto between corresponding semicircular portions of the jaw underside and bracket.

The inner semicircular portion of the bracket further includes groove (128) corresponding to cooperating annular groove (130) adjacent the screw opposing end portion (122). An additional corresponding groove (132) is formed in the aforesaid semicircular underside of the movable jaw so that the upper half (132) of a split washer may be engaged therein and extend into the corresponding annular groove (130) of the screw. Likewise, lower half (134) of the split washer fits within groove (128) of the bracket. Set screw (136) threadedly extends through the bracket into the groove to contact the edge of split washer portion (134). Tightening and loosening of the set screw provides a releasable securement means for the positioning screw and prevents the unwanted rotation thereof.

Figure 17:
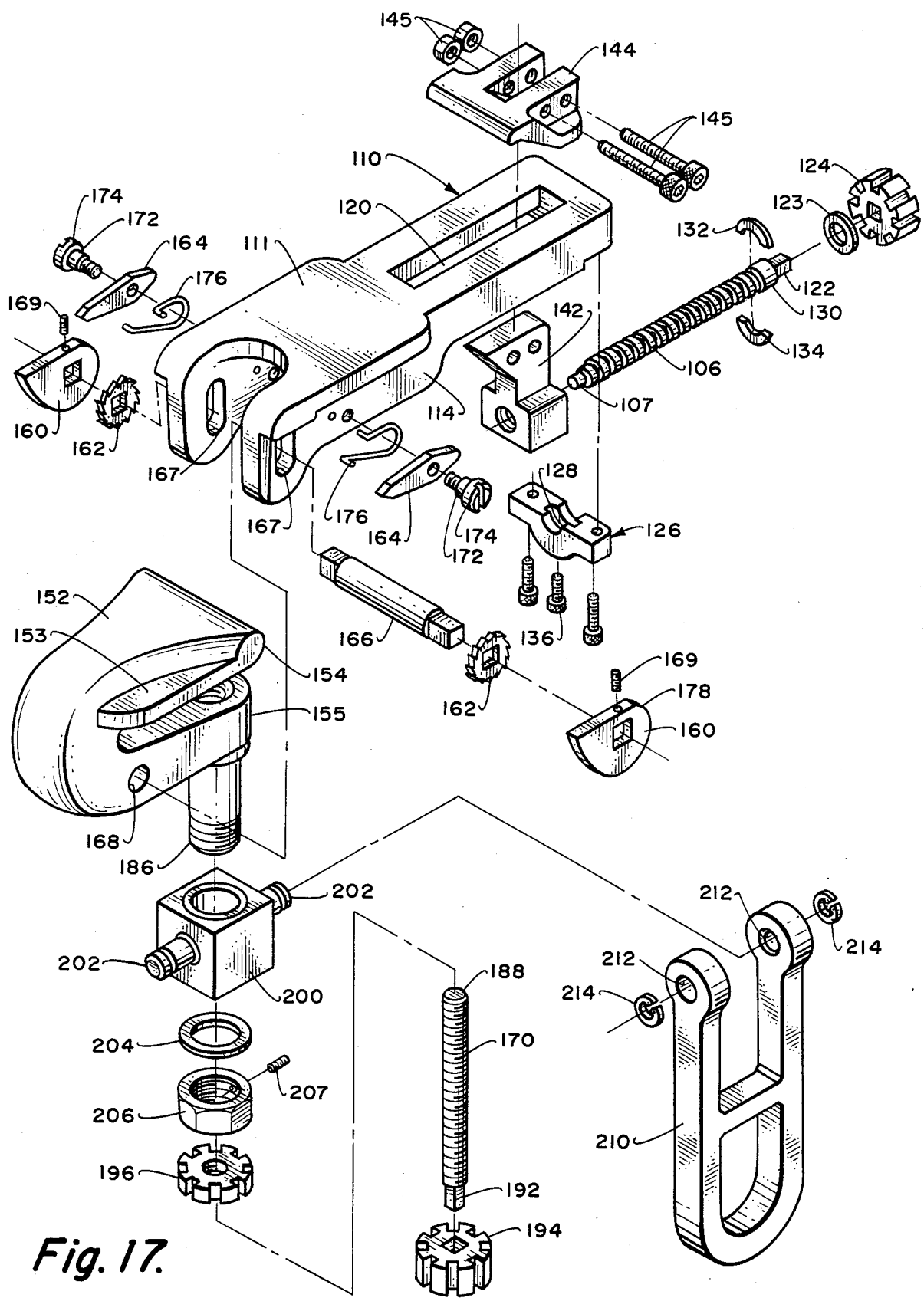
FIG. 17 is an exploded perspective view of the clamp of FIG. 11.

Cleat (118) comprises the aforesaid lower portion (116) through which the screw is threaded and an upper portion (140) extending above the movable jaw upperface (111). As best shown in FIG. 17, the cleat is constructed of an inner part (142) and a bifurcated part (144). The two parts are secured together with fastening means (145). When assembled, an inwardly facing abutment surface (146) is formed in the upper portion of the cleat.

Figure 11:
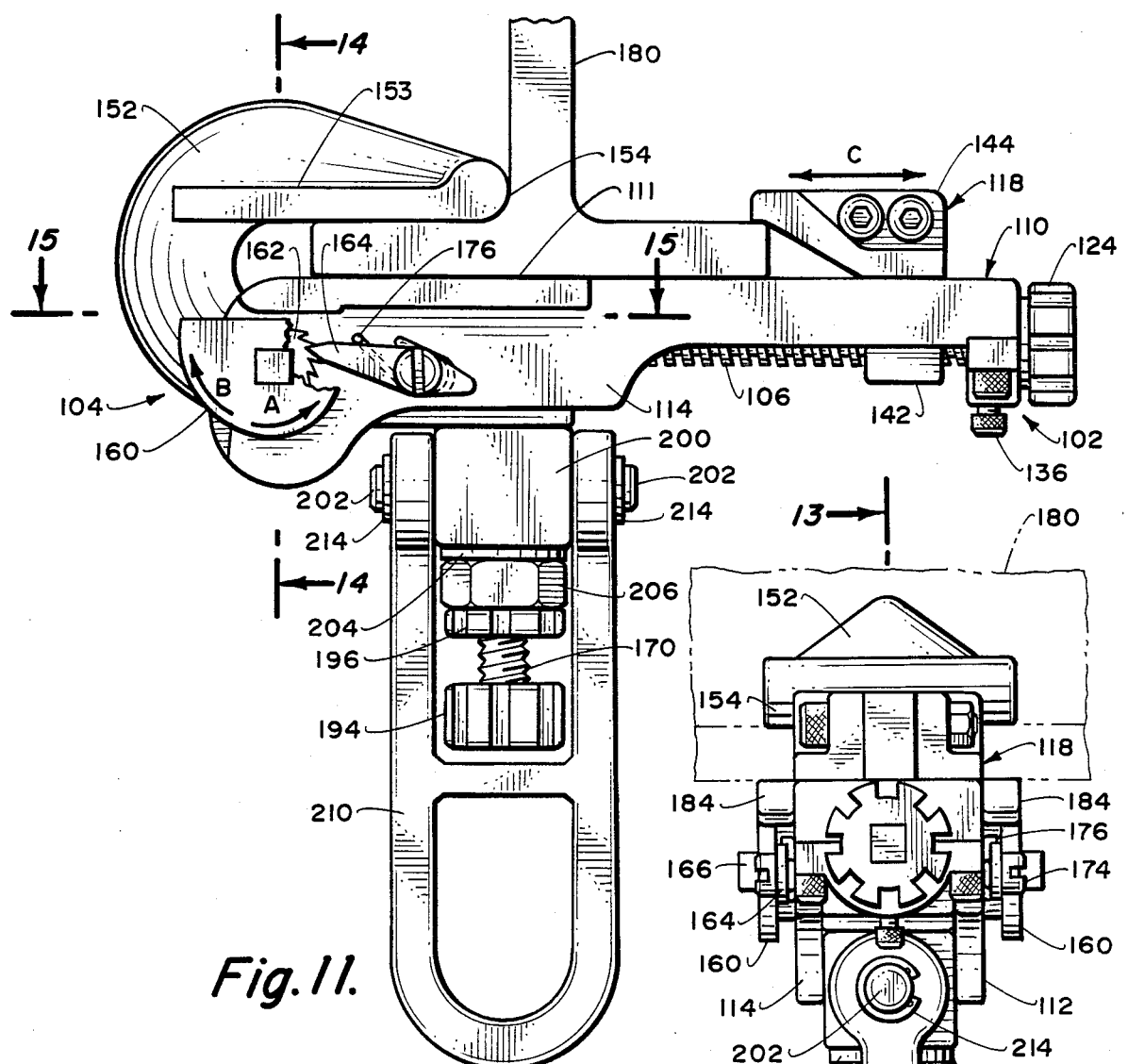
FIG. 11 is a side elevation view of an alternative embodiment of the beam clamp of the present invention secured to a beam with a cam member partially broken away.
Figure 12:
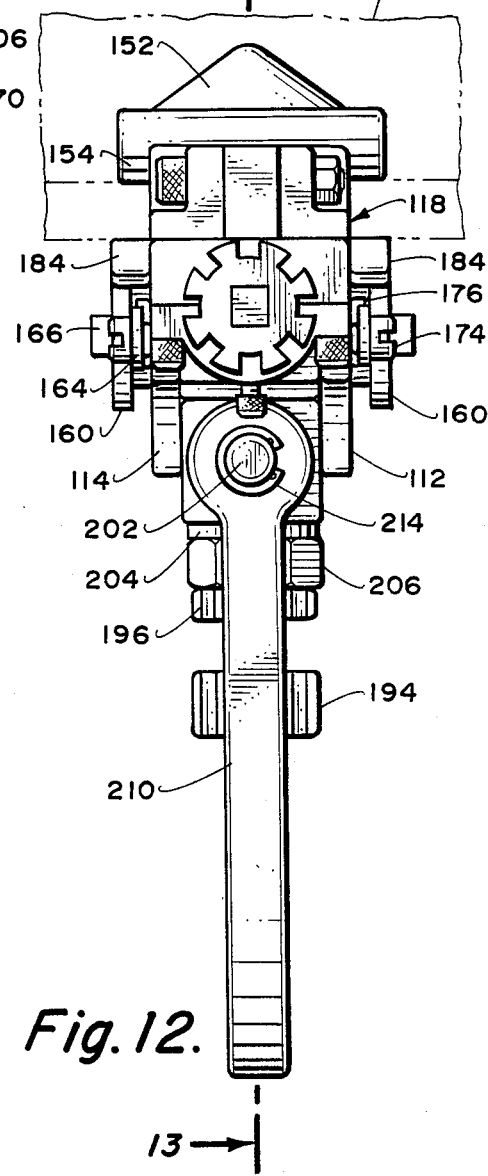
FIG. 12 is an end elevation view of the clamp shown in FIG. 11.
Figure 14:
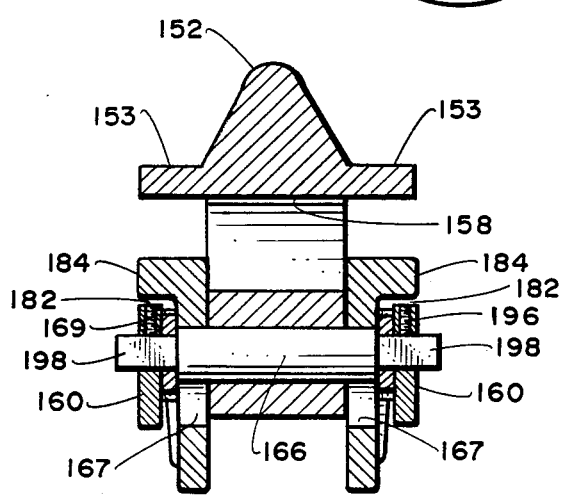
FIG. 14 is a cross-sectional view taken along lines 14—14 of FIG. 11.

With reference to FIGS. 11 and 17, the auxiliary pressure means (114) will now be described. The pressure means comprises a force transmission mechanism with an operator for imparting a clamping force to the movable jaw within the open region (150) of the stationary jaw (152). The operator of the force transmission mechanism may comprise any one or combination of screw, gear, cam, lever, pneumatic or hydraulic cylinder. In the specific embodiment shown, a cam member (160) is utilized in combination with a ratchet (162) and pawl (164). Preferably, the operator will work on both sides of the movable jaw, as shown, for a balanced force distribution. However, it's within the purview of the present invention to utilize one operator located on the clamp in a manner to impart a balanced force. In such case, it is conceivable a single mechanism could be located between the side walls (112), (114) and operate along the longitudinal axis of the jaws.

As shown, pivot pin (166) extends through elongated openings (167) of each of the movable side walls (112), (114) and through aperture (168) of the stationary jaw (152). Secured to opposing ends of the pin are ratchets (162) with cam members (160) secured outwardly therefrom by set screws (169). Pawl (164) rotates about boss (172) of threaded member (174) which secures the pawl to each of the opposing side walls adjacent the cam and ratchet assembly. The pawl is offset therefrom and is sized to engage the teeth of the ratchet, as best shown in FIG. 11, to inhibit clockwise rotation of the cam and ratchet. Preferably, the pawl is biased against the ratchet by spring (176) which interconnects the pawl to the side wall.

The cam member is configured to have a curved surface (178) for bearing against the underside surfaces (182) of opposing flanges (184) of the movable jaw. In this way, counterclockwise rotation in the direction of Arrow A in FIG. 11 will transmit an upper force against the movable jaw. Such force will be maintained by virtue of the engagement of pawl (164) in the teeth of cam (160).

The arched stationary jaw (152) is provided with an enlarged beam abutment face (154) to inhibit lateral dislodgement of a beam (180) clamped therein and to distribute clamping force over an enlarged area. Extending transversely from the lower arm (155) of the stationary jaw is anchor shaft (186). The anchor shaft is hollow and clamp screw (170) extends therethrough and is threaded to corresponding interior threads of stationary jaw lower arm (155). Upper end (188) of the clamp screw bears against pad (190) on the underside of the movable jaw. Lower end (192) is provided with manual engagement means shown as knob (194). The knob allows for manual rotation of the screw.

A collar (200) is mounted for rotation about anchor shaft (186). The collar includes load connector means comprising mounting posts (202). The lower exterior portion of the anchor shaft is threaded and the collar is retained for rotation thereabove with washer (204) and nut (206). Nut (206) is secured from loosening with a set pin (207). Clamp screw (170) freely rotates within the interior of anchor shaft (186), washer (204) and nut (206).

A locking mechanism is provided for the clamp screw with locking nut (196). The clamp screw is threaded through the lock nut. When the clamp screw is in place, the lock nut can be tightened against nut (206) to thereby secure the clamp screw from unwanted rotation. Of course, set screws, pins and other means known in the art could be used.

A connector member shown as hanger (210) is attached to post (202) through openings (212) at the free ends thereof. Split rings (214) engage corresponding grooves on the posts to hold the hanger thereon.

The overall operation of the beam clamp shown in FIGS. 11-17 is basically similar to the clamp shown in FIGS. 1-10. Initially, clamp screw (170) is rotated to lower the movable jaw to its lowermost position within opening (150) of the stationary jaw (152). The cleat is retracted by rotation of positioning screw (106). This, of course, is accomplished by grasping knob (124) and rotating it in a counterclockwise direction as viewed in FIG. 12.

With the beam clamp fully open, it may now be placed upon the flanges of a support structure such as beam (180). The clamp may be slid onto the beam flange until the inner face (154) of the stationary jaw abuts against the web of the beam. Subsequently, knob (124) will be rotated to move cleat (118) along the slot opening (120) until it engages an opposing surface (flange) of the beam. The cleat abutment surface (146) may be forced against the beam flange by tightening the positioning screw. Subsequently, lock member (136) may be tightened to force the lower part (134) of the split washer against annular groove (130) of the positioning screw so that it will be firmly locked in place.

With cleat (118) secured against the beam flange, the clamp screw (170) and force transmission mechanism may be alternately operated to elevate the movable jaw against the beam. With respect to the cam mechanism, wrench (216) with hooked end (217) may be utilized to engage cam member (160) and rotate it in the direction shown by Arrow A in FIG. 11. The curved surface (178) will thereby frictionally engage flange underside surfaces (182) resulting in a lifting of the movable jaw. This may be done until the jaw has elevated the beam flange firmly against the underside (158) of the stationary jaw. Alternately, the closed end opening (218) of the wrench may be engaged with the exposed ends (198) of the pivot pin for exerting rotational force to the cam member and movable jaw.

With the beam snugged to underside (158), the clamp screw, with lock nut (196) loosened, may be rotated so that its end (188) will contact pad (190) and impart an additional upward clamping force against the beam. Thereafter, further tightening of the cam mechanism may occur followed by additional tightening of the clamp screw until both are firmly tightened. With the clamp screw fully tightened, lock nut (196) will then be rotated and securely against nut (206) to prevent further rotation of the clamp screw. Note that the cam member is already secured against unwanted rotation by engagement of the pawl into the teeth of the ratchet. Spring (176) biases the pawl against the ratchet and assists in insuring engagement of the pawl to the teeth during a rotation.

With the clamp firmly tightened and secured to a beam structure, the clamp may now be connected to other connecting assemblies in the same manner as the clamp shown particularly in FIGS. 9 and 10. All the features and efficiencies of the clamp of FIGS. 1-10 are applicable to the clamp shown in FIGS. 11-17 with the further advantage of a more conveniently operated cleat member and a more balanced and effective clamping force.

While the invention has been described with respect to the preferred embodiments, it will be apparent to those skilled in the art that other modifications may be made without departing from the scope and spirit of the invention. It is therefore to be understood that the invention is not to be limited by the above specific illustrative embodiments but only by the scope of the appended claims.

I claim:

1. A beam clamp comprising:
    an arched stationary jaw having an upper arm and lower arm defining an opening therebetween;
    a movable jaw pivotally connected to said stationary jaw having an upper face;
    a cleat mounted upon said upper face with releasable securement means, said cleat being movable along the longitudinal axis of said movable jaw;
    an anchor shaft extending transversely through said lower arm having a hollow threaded interior and a lower portion extending below the lower arm of said stationary jaw;
    a collar mounted for rotation about the shaft lower portion; and
    a clamp screw in threaded engagement with said anchor interior having an upper end adapted for engagement with the underside of said movable jaw and a lower end having manual engagement means.

2. The clamp of claim 1 wherein said collar includes load connector means comprising at least one mounting post extending outwardly from said collar and a connector member attached thereto.

3. The clamp of claim 2 wherein said connector means comprises two posts located on opposite sides of the collar and said connector member comprises a U-shaped hanger having openings at the free ends thereof for rotatable engagement with said posts.

4. The clamp of claim 1 wherein said manual engagement means is selected from the group consisting of an orifice, slot, notch, knob, tab, cap and handle.

5. The clamp of claim 1 wherein said clamp screw includes a locking mechanism to prevent undesired rotation.

6. The clamp of claim 5 wherein said mechanism is mounted on the movable jaw for releasable engagement with the upper end of said clamp screw.

7. The clamp of claim 6 wherein the locking mechanism includes a pressure pad stationarily secured to the upper end of said screw having notches about its peripheral edge; and, a spring-biased plunger mounted transversly on the side of said movable jaw adjacent said pad with said plunger in alignment with said notches for releasable engagement therewith.

8. The clamp of claim 1 wherein said cleat has an inclined inwardly facing beam engagement surface.

9. The clamp of claim 8 wherein said movable jaw has an elongated opening therethrough along a portion of its longitudinal axis; and, said cleat securement means comprising a cap screw extending from beneath said jaw through said opening into threaded engagement with the cleat.

10. The clamp of claim 9 wherein the bottom of said cleat includes a guide member that extends into said opening.

11. The clamp of claim 10 wherein at least a portion of said upperface of the movable jaw is grooved perpendicular to the longitudinal axis thereof and at least a portion of the bottom of said cleat is correspondingly grooved for matching engagement with the cleat is drawn against said face with the cap screw.

12. The clamp of claim 8 including a beam engagement member mounted on the free end of said stationary jaw upper arm.

13. The clamp of claim 12 wherein the inwardly directed face of said beam engagement member is parallel to and about coextensive with the cleat beam engagement surface.

14. The clamp of claim 5 wherein said mechanism comprises a locknut threaded to said clamp screw.

15. A beam clamp comprising:
an arched stationary jaw having an upper arm and lower arm defining an opening therebetween;
a movable jaw pivotally connected to said stationary jaw having an upper face and an elongated opening therethrough along at least a portion of the longitudinal axis thereof;
a movable cleat connected to said movable jaw extending through said opening and above the upper face;
positioning means connected to said movable jaw and said cleat for moving the cleat to predetermined locations along the opening;
an anchor shaft extending transversely through said lower arm having a hollow threaded interior; and,
a clamp screw in threaded engagement with said anchor interior having an upper end adapted for engagement with the underside of said movable jaw and a lower end having manual engagement means.

16. The clamp of claim 15 wherein said cleat comprises an upper portion that extends above said upper face having a beam engagement surface and a lower portion connected to said positioning means.

17. The clamp of claim 16 wherein said positioning means comprises any one or combination of screw, gear, cam, lever, hydraulic or pneumatic cylinder and electromagnetic device.

18. The clamp of claim 17 including releasable securement means connected to said positioning means to inhibit unwanted movement of said cleat.

19. The clamp of claim 18 including a bracket secured to said movable jaw; said positioning means comprising a positioning screw threaded through the cleat lower portion, said screw journalled at its first end to said lower jaw and journalled proximate its opposing second end to said bracket.

20. The clamp of claim 19 wherein said securement means comprises an inner annular groove within said bracket and concentric to said positioning screw, said groove housing a split washer; and, a set screw threaded through said bracket into the groove aligned to impinge upon the edge of said washer.

21. The clamp of claim 1 including auxiliary pressure means assembled to the stationary jaw for exerting clamping force to said movable jaw.

22. The clamp of claim 21 wherein said pressure means comprises a force transmission mechanism having an operator to transmit said clamping force.

23. The clamp of claim 22 wherein said operator comprises any one or combination of screw, gear, cam, lever, hydraulic or pneumatic cylinder, and electromagnetic device.

24. The clamp of claim 23 wherein a fixed pivot pin extends through the lower arm of said stationary jaw and through openings in opposing side walls of said movable jaw, said force transmission mechanism comprising a cam as said operator and a concentric ratchet fixed to each end of said pivot pin with a pawl rotatably mounted on an adjacent sidewall of the movable jaw proximate said ratchet for cooperating engagement therewith.

25. The clamp of claim 15 including auxiliary pressure means assembled to the stationary jaw comprising a force transmission mechanism having an operator to transmit a clamping force to said movable jaw.

26. The clamp of claim 25 wherein said operator comprises any one or combination of screw, gear, cam, lever, hydraulic or pneumatic cylinder, or electro-magnetic device.

27. The clamp of claim 26 wherein a fixed pivot pin extends through the lower arm of said stationary jaw and through openings in opposing side walls of said movable jaw, said force transmission mechanism comprising a cam as said operator and a concentric ratchet fixed to each end of said pivot pin with a pawl rotatably mounted on an adjacent sidewall of the movable jaw proximate said ratchet for cooperating engagement therewith.

28. The clamp of claim 27 wherein said cam is manually rotated to engage the underside of said movable jaw and effect said clamping force.

* * * * *